UNITED STATES PATENT OFFICE.

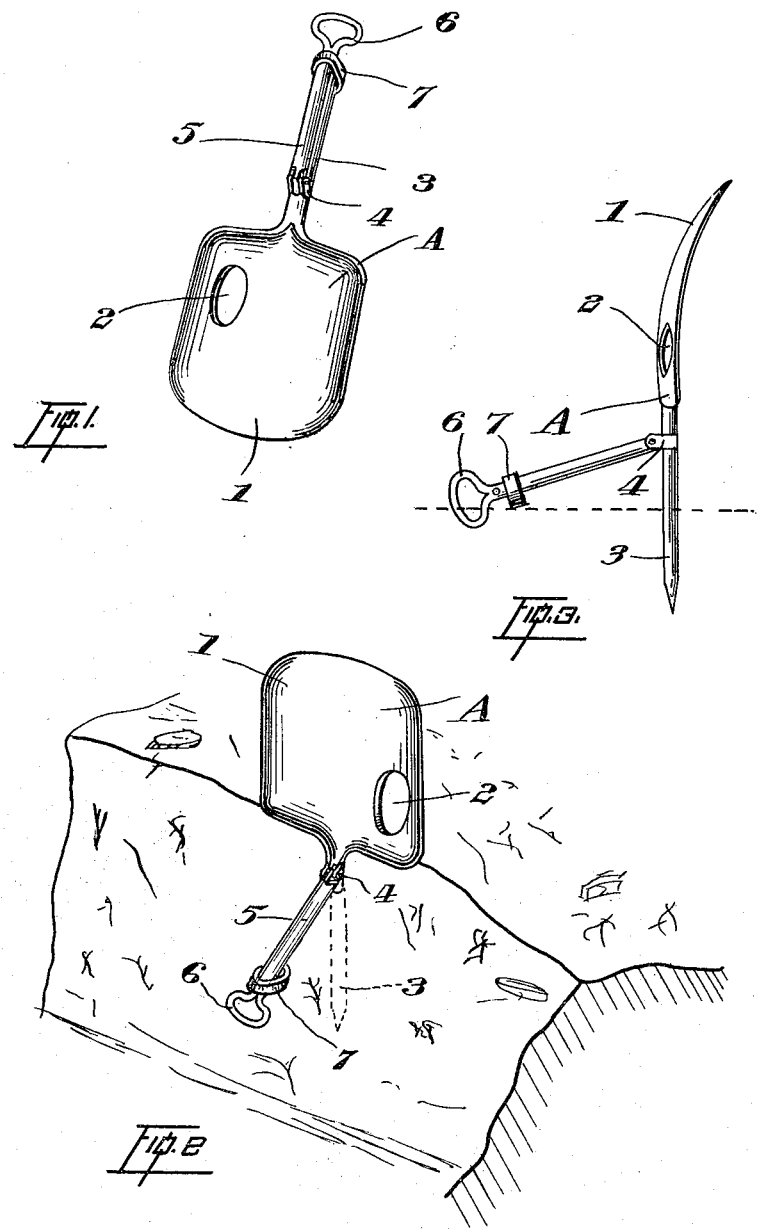

ENA MacADAM, OF OTTAWA, ONTARIO, CANADA.

COMBINATION-SHOVEL.

1,148,180.

Specification of Letters Patent.

Patented July 27, 1915.

Application filed August 24, 1914. Serial No. 858,379.

*To all whom it may concern:*

Be it known that I, ENA MACADAM, a subject of the King of Great Britain, residing at the city of Ottawa, Province of Ontario, Dominion of Canada, have invented certain new and useful Improvements in Combination-Shovels, and do hereby declare the following to be a full, clear, and exact description of the invention, such as will enable others skilled in the art to which it appertains to make and use the same.

This invention relates to combination shovels adapted to be utilized by the military, and the objects of the invention are to facilitate mounting the shovel on the top of a parapet or the like thereby providing a shield to protect the head of a soldier in the act of firing, to so anchor the inverted shovel in position that turning due to impact of the bullets thereon is obviated, to so support the shovel that impinging bullets will strike the concave surface and will not be deflected therefrom, and other objects which will be made clear hereinafter, and it consists essentially in the improved construction of shovel particularly described and set forth in the following specification and accompanying drawings forming part of the same.

In the drawings, Figure 1 is a perspective view of the improved shovel. Fig. 2 is a perspective view of the inverted shovel transformed into a shield and mounted on a parapet. Fig. 3 is a side elevation of the improved shovel.

Like characters of reference refer to like parts in the several drawings.

Referring to the drawings, A represents the improved shovel comprising the blade 1 which is formed with a substantial curve having a firing loop hole 2, located near one side thereof, such blade being provided with a spike 3 formed integral therewith. This spike is provided at that end adjacent to the blade 1 with lugs 4 having an orifice therethrough the object of which will be made clear hereafter. Coöperating with the spike 3 is a shaft 5, the lower end of which is pivotally mounted in the lugs 4, the other end being provided with a handle 6 of any suitable type. To secure the shaft 5 in engagement with the spike 3, I preferably employ a collar 7 which frictionally engages with the said shaft and spike at that end adjacent to the handle 6 but is adapted to be slidably disconnected from the spike, thereby permitting the shaft 5 to be rotated about its pivoted end.

The shovel is designed to be used in a dual capacity, first for throwing up parapets or the like and secondly as a shield and to this end the collar 7 is disengaged from the spike 3 and slid toward the handle 6 of the shaft when the shaft 5 is rotated about its pivoted end so permitting of the spike 3 being firmly driven into the ground until the lower edge of the inverted shovel engages with the surface of the ground, whereupon the shaft 5 is caused to lie along the said surface of the ground with the handle 6 partially embedded therein. It will of course be understood that in this position the convex surface of the shovel looks inwardly toward the inner side of the parapet so that bullets will impinge upon the concave side and not be deflected thereby. It will be clearly seen that a shovel used in this manner provides an excellent shield for the head of a soldier in the act of firing, while the location and size of the firing opening 2 does not necessitate the head being exposed in taking aim.

The shovel blade is manufactured of any suitable resilient material having the necessary hardness to resist a rifle bullet and may be of nickel, vanadium steel, or the like.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. A combination shovel and shield comprising a blade, a two-part handle therefor, one part of which is rigidly connected to the blade and is provided with a pointed end, the other part of which is pivotally connected thereto and is provided with a hand grip, and means for securely fastening the two parts in parallel relation to one another.

2. A combination shovel and shield comprising a blade having a loop hole therethrough, a two part handle therefor, one part of which is rigidly connected to the blade and is provided with a pointed end, the other part of which is pivotally connected thereto and is provided with a hand grip, and means for securely fastening the two parts in parallel relation to one another.

3. A shovel of the class described comprising a blade having a loop hole therethrough, a spike formed integral therewith, lugs formed on the lower end of the said spike, a shaft pivotally mounted in the said lugs and means for securing the shaft and spike in engagement.

4. A shovel of the class described comprising a blade having a loop hole therethrough, a spike formed integral therewith, lugs formed on the lower end of the said spike, a shaft pivotally mounted in the said lugs such shaft being provided with a handle and a collar adapted to engage with the said spike and shaft substantially as described.

In witness whereof I have hereunto set my hand in the presence of two witnesses.

ENA MacADAM.

Witnesses:
JAMES MITCHELL,
RUSSEL B. SMART.